Figure 1:
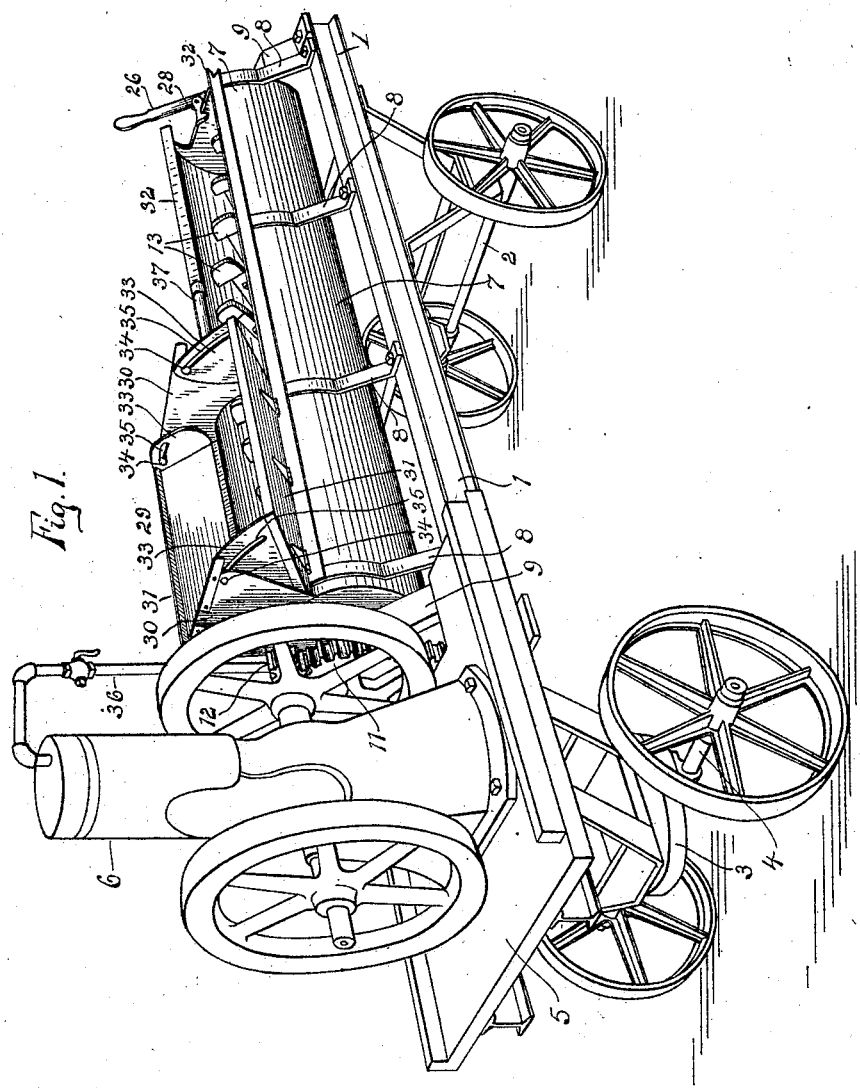

No. 842,206. PATENTED JAN. 29, 1907.
J. E. KENISELL & C. C. LOWRY.
CONCRETE MIXER.
APPLICATION FILED SEPT. 18, 1905.

2 SHEETS—SHEET 1.

WITNESSES:
Joseph A. Noelke
Thos. G. Longstaff

INVENTORS:
John E. Kenisell
Clarence C. Lowry
BY
Barthel & Barthel
ATTORNEYS.

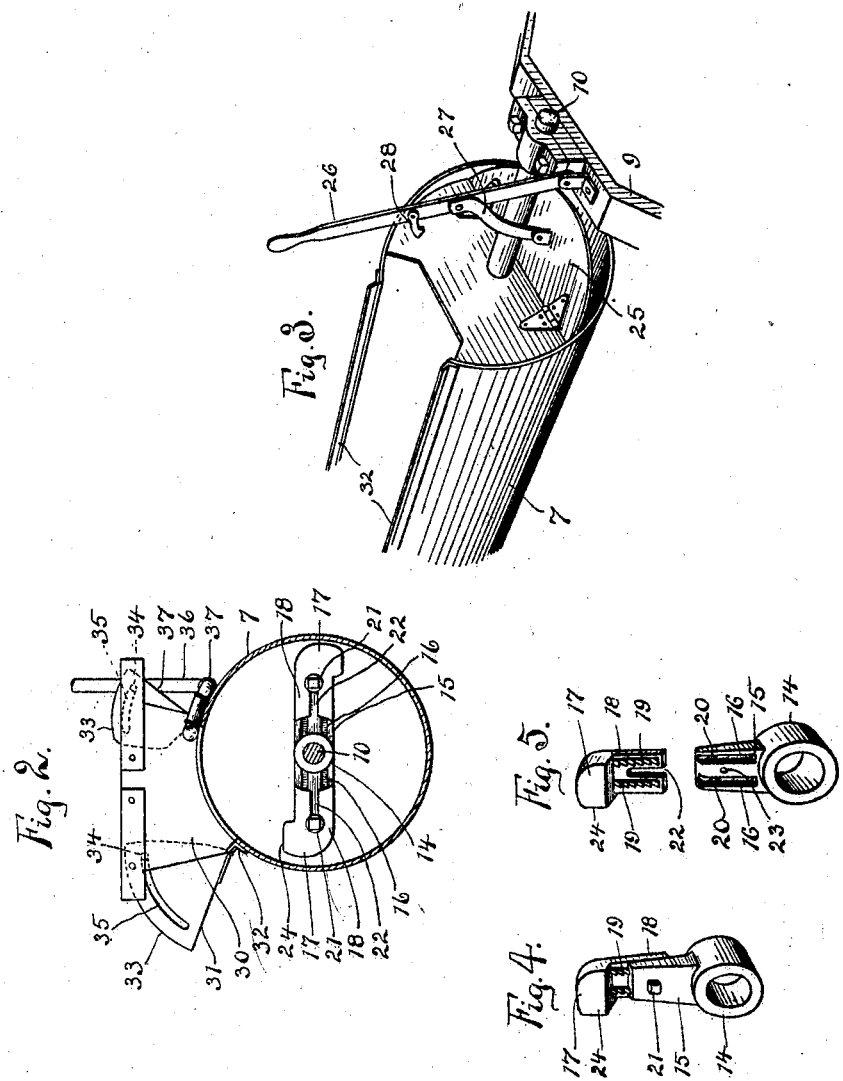

UNITED STATES PATENT OFFICE.

JOHN E. KENISELL AND CLARENCE C. LOWRY, OF DETROIT, MICHIGAN.

CONCRETE-MIXER.

No. 842,206.      Specification of Letters Patent.      Patented Jan. 29, 1907.

Application filed September 18, 1905. Serial No. 278,910.

*To all whom it may concern:*

Be it known that we, JOHN E. KENISELL and CLARENCE C. LOWRY, citizens of the United States of America, residing at Detroit, in the county of Wayne and State of Michigan, have invented certain new and useful Improvements in Concrete-Mixers, of which the following is a specification, reference being had therein to the accompanying drawings.

This invention relates to improvements in machines for mixing concrete, mortar, or other cementitious material; and its object is to provide a cheap and efficient device for the purpose which is so constructed that it may be operated either as a continuous or as a batch mixer and which is provided with certain improvements in the construction of its hopper, whereby the labor of shoveling the material into the same is lessened.

It is also an object of the invention to so construct the mixing and conveying arms that they may be extended as they wear off and when worn out may be quickly repaired at a small expense by substituting a new part for the old one; and a further object is to provide a device having the several advantages of the particular construction, arrangement, and combination of parts, all as hereinafter more fully described, and shown in the accompanying drawings, in which—

Figure 1 is a perspective view of a device embodying the invention; Fig. 2, a transverse section through the trough adjacent to the hopper; Fig. 3, a perspective detail of the discharge end of the trough; Fig. 4, a perspective view of one of the mixing-arms, and Fig. 5 a similar view showing the parts of the arms separated.

As shown in the drawings, 1 is a suitable frame formed of parallel I-beams, which are supported at their rear ends upon a rear axle 2 and at their forward ends upon a circle 3, secured to the front axle 4, said axles being provided with suitable supporting-wheels. Upon the forward end of the frame is secured a platform 5, to which is bolted a motor 6, preferably a gasolene-engine, and extending longitudinally of the frame at the rear of the motor is a cylindrical-shaped trough 7, held in place on the frame by braces 8.

Secured to the frame adjacent to the ends of the trough are the cross-bars 9, provided with bearings for the shaft 10, which extends in the longitudinal axis of said trough and is provided at its forward end with a large gear 11, in mesh with a pinion 12 on the end of the engine-shaft, and secured to this shaft within the trough are two series of agitating and conveying arms 13, so secured on the shaft as to form two oppositely-extending spiral rows. Each of these arms 13 consists of a sleeve portion 14, adapted to be slipped upon the shaft and secured thereto in any suitable manner, and extending laterally from said sleeve is a shank portion 15, provided with parallel grooves 16 longitudinally of one of its side faces.

17 is a head portion formed with a shank 18, provided with two parallel rows of teeth 19, extending longitudinally of and projecting from one side face of said shank to engage and lie within the grooves 16, each of which is provided near its outer end with a tooth or rib 20 to engage between the teeth 19 when said shanks are secured together by a bolt 21, extending through a slot 22 in the shank 18 and a hole 23 in the shank 15. One edge 24 of the head 17 extends forwardly a short distance in the direction of travel of said arms, as shown by the arrows in Fig. 2, and forms a blade to divide and stir the material, at the same time serving as conveyers to force the material along the trough toward its rear or discharge end, said shank 15 being formed on its sleeve at an angle to the path of its rotation, so that the blade is given a lead or inclination.

By making the arms in two parts and adjustably securing the same together, as described, the same may be lengthened when their outer ends have become worn off, and thus the length of time which they may be used greatly increased, and when a head is worn out or broken the expense of repair or renewal is greatly lessened, as a new head may be quickly secured in place on the arm without removing the arm from its shaft.

The trough is preferably left open along its top, so that the operator may watch the operation of the machine and may add ingredients to the mixture, if desired, at any stage during the process of mixing, and the ends of the trough are closed, the rear or discharge end being provided with a hinged door 25, which is left open when it is desired to have the machine operate continuously; but when it is desired to mix a batch at a time this door is closed to confine the material in the trough until the batch is mixed and then opened to discharge the same. The door is operated and held closed by a hand-lever 26, pivoted at one end on the supporting-frame or cross-bar 9 and connected to the door by a link 27, pivoted at one end to the door and at its opposite end to the lever intermediate the ends thereof. A latch 28, carried by the handle, is adapted to engage the edge of the end of the trough when said handle is in a position to hold the door closed and secure said handle in that position.

The dry material to be mixed is introduced into the forward end of the trough through a hopper 29, consisting of stationary ends 30, secured to the trough, and movable sides 31, which are hinged at their lower edges to the upper edges of angle-bars 32, riveted along the upper edges of the trough. Inwardly-extending flanges 33 are provided on the ends of these movable hopper sides to engage the inner surface of the stationary ends, and bolts 34 extend through openings in the ends and curved slots 35 in the flanges to limit the movement of the sides and serve to hold said sides in any position to which they may be adjusted by tightening the nuts on the bolts. By making the hopper in this manner, so that either of its sides may be lowered, the shoveling of the material from either side of the machine into the hopper is greatly facilitated.

No water is introduced into the forward end of the trough or that part which is beneath the hopper, so that the materials are first mixed dry. They are then dampened the desired amount by water supplied from the water-jacket of the engine through a pipe 36 leading therefrom, said pipe extending downward from the upper end of the engine-cylinder to the top of the trough, thence along the trough past the hopper, and inward to the opening in the top of said trough, where it is provided with an end portion 37, extending along said edge part way to the rear end of the trough and which end portion is perforated along its lower side to allow the water to escape in small streams.

Having thus fully described the invention, what we claim is—

1. In a mixing-machine, the combination with a supporting-frame, of a trough secured to said frame, mixing and conveying arms in said trough, means for actuating said arms, and a hopper consisting of ends secured to the trough and provided with openings and sides hinged at their lower edges to the trough and formed with inwardly-extending end flanges having curved slots, and bolts extending through the openings in the ends and the slots in the flanges.

2. In a mixing-machine, the combination with a receptacle within which the material is mixed, a shaft in said receptacle, and means for actuating said shaft, of a series of agitating-arms on said shaft consisting of a sleeve portion adapted to be secured to the shaft, a shank portion extending outward from said sleeve, a head, a shank portion on the head, teeth on the adjacent sides of the shanks adapted to interlock and means for securing the shanks together.

3. In a mixing-machine, the combination with a receptacle within which the material is mixed, a shaft in said receptacle, and means for actuating said shaft, of a series of agitating-arms secured on said shaft each consisting of a sleeve portion, a shank portion formed integral with the sleeve and provided with parallel longitudinal grooves in one face, and a hole, a rib or tooth in each groove, a head portion, a shank on said head provided with a longitudinal slot, two parallel rows of teeth on said shank to engage the grooves and teeth on the other shank portion, and a bolt extending through the said hole and slot.

4. In a concrete-mixer, the combination with a suitable supporting-frame supported upon wheels, of a trough secured to the frame and provided with closed ends and open at its top, angle-irons secured to the trough along its edges, a hopper consisting of stationary ends secured to the trough and sides hinged to the angle-iron at their lower edges, flanges on said sides having curved slots, bolts extending through said slots and ends, bearings at the ends of the trough, a shaft in said bearings, agitating and conveying arms on said shaft, a gear on the forward end of said shaft, a motor, a gear on the motor-shaft engaging the other gear, a door in the rear end of the trough hinged thereto at its upper edge, a lever pivoted to the frame, a link pivoted at one end to the door and at its opposite end to the lever intermediate its ends, a catch on the lever to engage the upper edge of the end wall of the trough, and a water-pipe extending past the hopper and provided with a perforated end portion extending longitudinally within the open top of the trough rearwardly from the hopper.

In testimony whereof we affix our signatures in presence of two witnesses.

JOHN E. KENISELL.
CLARENCE C. LOWRY.

Witnesses:
OTTO F. BARTHEL,
ANNA M. DORR.